June 17, 1941.  P. MAGRINI  2,246,053
MANUFACTURE OF DRAWN GLASS
Filed May 4, 1938  2 Sheets-Sheet 1

INVENTOR
Pete Magrini

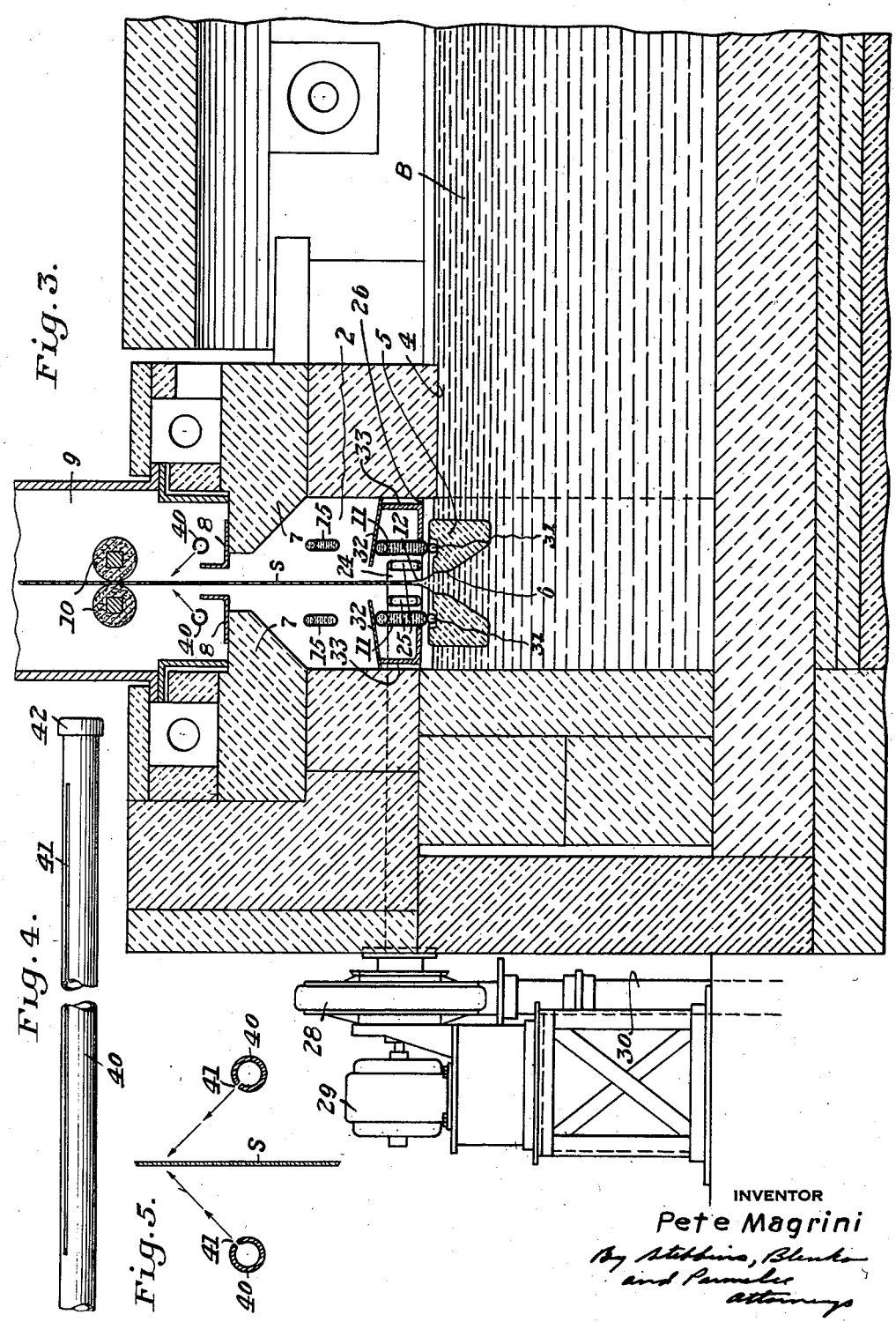

Patented June 17, 1941

2,246,053

UNITED STATES PATENT OFFICE 2,246,053

MANUFACTURE OF DRAWN GLASS

Pete Magrini, Belle Vernon, Pa., assignor to American Window Glass Company, Pittsburgh, Pa., a corporation of Pennsylvania Application May 4, 1938, Serial No. 205,959

25 Claims. (Cl. 49—17)

The present invention relates broadly to the manufacture of sheet glass by substantially continuous drawing from a bath of molten glass. More particularly, it relates to a method and apparatus whereby glass may be continuously drawn from a bath of molten glass without the presence therein of any substantial amount of waves and batter which are characteristic of drawn glass. My invention provides a method and apparatus whereby this desired result can be achieved without detrimentally affecting the fine fire polish which is characteristic of drawn glass or the annealing thereof.

In the various commercial processes of manufacturing sheet glass as practiced heretofore the glass is drawn vertically from a bath of molten glass in a drawing chamber, the molten glass being fed to the drawing chamber either directly from a melting furnace or through canals connecting the melting furnace and the drawing chambers. In some of these processes the glass sheet is drawn vertically from the bath past setting means and then continues vertically throughout the drawing chamber and into the base of a vertically extending lehr at the top of which the rising glass sheet is cut to appropriate size. In at least one other of these processes the glass sheet is drawn from the molten glass past setting apparatus and while still in the drawing chamber it is turned horizontally over a roll and then passes horizontally through an appropriate cooling lehr at the end of which the continuous sheet is cut to appropriate size. In the so-called Fourcault process the glass sheet is drawn upwardly from a slot in a floater positioned at the surface of the glass bath in the drawing chamber while in other processes the sheet is drawn directly from the surface of the bath both with and without submerged forming bars. The present invention is applicable to any of these known processes or to any other process wherein the glass sheet is formed by substantially continuous drawing from a bath of molten glass.

In all of these processes as practiced heretofore the glass produced has a characteristic wave extending longitudinally of the rising glass sheet. This wave is objectionable in view of the fact that it causes distortion of objects viewed therethrough and this is particularly true with respect to objects which are viewed at a relatively sharp angle therethrough. In addition to this defect the product resulting from the practice of any of the aforesaid processes has been objectionable from the standpoint of batter. As is well known in the glass art, batter is the condition resulting from repeated forces striking the surface of the glass sheet and causing indentations therein resembling those in hammered metal articles. These repeated forces are evidently the result of various air currents in the pit striking the glass perpendicularly or at another substantial angle relative thereto. Batter likewise causes distortion of objects viewed through the glass sheet.

The application of Albert J. Bundy, Serial No. 205,941, filed May 4, 1938, Patent No. 2,201,286, dated May 21, 1940, discloses a method whereby these defects may be materially reduced. It is the purpose of the present invention to provide a method and apparatus whereby these defects can be further minimized or substantially eliminated. I have found in actual practice that by the use of the present invention the objectionable waves and batter which have heretofore been characteristic of drawn glass can be still further reduced.

In accordance with my invention I utilize a transverse flow of air or gas adjacent the meniscus of the rising glass sheet from one edge of the sheet to the other edge thereof and exhaust the circulated air or gas or at least a substantial portion thereof from the drawing chamber. This exhausting of the gas from the drawing chamber may be accomplished by the use of a suitable stack or by the use of any of the well-known exhausting mechanisms. I have found that where the gas is exhausted from the drawing chamber in the manner described a more uniform transverse flow of gas adjacent the meniscus can be effected and the transverse flow can be provided throughout substantially the entire width of the glass sheet. Where such exhausting apparatus is not employed and reliance must be placed upon the stack effect of the drawing chamber and the lehr, I have found that waves and other defects will be present in the sheet adjacent the one end of the drawing chamber.

In accordance with the present invention I also provide for the shielding of the transverse flow of gas adjacent the meniscus of the rising glass sheet. By providing shielding means the transverse flow is rendered more uniform as the gas being circulated along the meniscus is at least partially prevented from escaping from the area immediately adjacent the meniscus and stray air currents are effectively hindered or prevented from joining the flow intermediate the edges of the rising glass sheet. In the ordinary Fourcault apparatus this shielding of the transverse flow may be accomplished in part by providing a shield beneath the coolers extending between the coolers and the debiteuse for blocking off this area. I also propose to use one or more shields extending at an angle to the rising glass sheet. These shields serve to at least partially prevent the transversely circulated gas from rising along the glass sheet and also prevent or at least substantially minimize the flow of stray air currents downwardly along the faces of the coolers, thereby minimizing or substantially preventing any of these stray air currents from striking the rising glass sheet at or adjacent the meniscus. These shields preferably extend longitudinally of the drawing chamber throughout the width of the rising glass sheet and extend from a point adjacent each side wall over top the coolers and inwardly of the coolers toward the glass sheet. It will be understood, however, that these shields may assume various different forms and may be variously positioned; for example, these shields may assume the form of projection flanges on the coolers.

These shields extending between the coolers and the debiteuse may assume any suitable form. For example, small angles may be utilized or, as is shown in the drawings and as will be pointed out more particularly hereinafter, pipe shields may be secured to the bottoms of the coolers.

In accordance with the present invention I also propose to utilize conduits or tunnels for supplying at least a portion of the transversely circulated gas to the drawing chamber and for exhausting at least a portion of the circulated gas from the drawing chamber at the opposite end of the drawing chamber from the end through which the gas is fed thereto. The gas delivery conduit or tunnel is preferably of such character as to deliver the gas to be circulated to the drawing chamber at a point adjacent the meniscus of the rising glass sheet at one edge thereof. In the ordinary Fourcault apparatus these tunnels may be mounted on the breast wall which is generally about an inch to an inch and a half above the level of the glass bath. The gas delivery tunnel is preferably forked so that the gas to be circulated will be delivered to both faces of the rising glass sheet so that the circulation will be effected uniformly along both faces. The gas discharge tunnel is preferably of a type similar to the gas delivery tunnel and is likewise forked and the inner end extends to a point adjacent the meniscus of the rising glass sheet. Where the gas is delivered to and exhausted from the drawing chamber by tunnels positioned in this manner the gas is delivered to and exhausted from the chambers at points adjacent the meniscus and between the coolers and the rising glass sheet, the coolers and the shields described above providing a substantially closed passageway through which the desired uniform circulation of gas can be effected. By delivering the gas to and exhausting it from this substantially enclosed passageway there is less opportunity for detrimental eddy currents of gas to form between the edges of the rising glass sheet adjacent the meniscus.

While I have stated that in accordance with my invention I propose to utilize conduits or tunnels for supplying at least a portion of the transversely circulated gas to the drawing chamber and for exhausting a portion from the drawing chamber at points adjacent the meniscus, the conduits of tunnels need not extend inwardly of the drawing chamber beyond the side walls thereof to achieve highly desirable results.

While good results can be obtained by the circulation of cold gas along the meniscus in the manner described above, I have found that still better results can be obtained by the use of a preheated gas. Where cold air, that is, air at atmospheric temperature is supplied to the drawing chamber and circulated transversely of the rising glass sheet, there is a marked tendency for the cold air to cause batter in the product. I have found that this batter can be materially reduced or substantially eliminated by supplying a gas which has been preheated to a temperature of approximately 375° F. The heating of this gas may be effected in any suitable manner. For example, gas may be fed from the canal into the tunnel and circulated transversely of the rising glass sheet or the gas exhausted from the drawing chamber may be circulated around the chamber and recirculated therethrough. In addition the preheating of the gas may be effected by supplying atmospheric air to the inlet end of the delivery tunnel and by heating the air by means of an electric heater during its passage through the tunnel and before it is discharged adjacent the meniscus of the rising glass sheet. It will be appreciated that any other suitable method of effecting the preheating of the gas can be utilized.

In the accompanying drawings I have shown for purposes of illustration only a preferred embodiment of my invention. In the drawings and in the succeeding specific description of my invention I have shown and described it as applied to the ordinary Fourcault drawing apparatus. It will be understood, however, that I do not intend that my invention shall be in any way limited by the disclosure of the drawings or the succeeding specific description of the embodiment shown in the drawings as my invention may be practiced in connection with any of the other known processes of maufacturing sheet glass and it may be embodied otherwise than as shown in the drawings and as set forth hereinafter.

In the drawings,

Figure 3 is a transverse sectional view through the drawing chamber shown in Figure 1 and a portion of the adjacent canal;

Figure 4 is a detail view of a portion of the mechanism shown in Figures 1 and 3; and Figure 5 is a diagrammatic view showing the manner in which air is blown against the rising glass sheet by the pipes illustrated in Figure 4.

Figure 1:
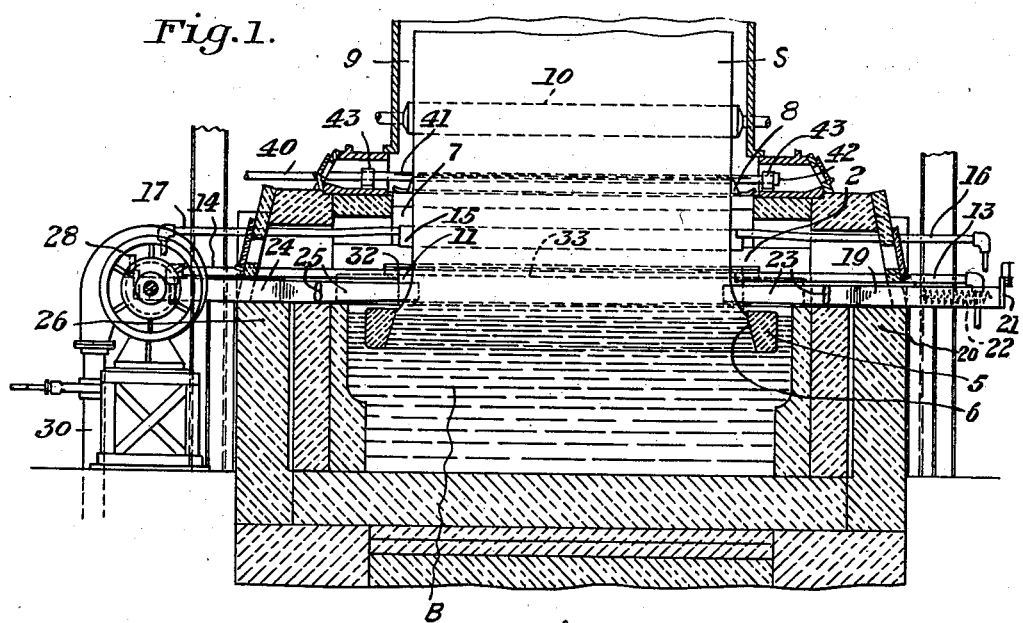
Figure 1 is a longitudinal sectional view through a drawing chamber embodying my invention.
Figure 2:
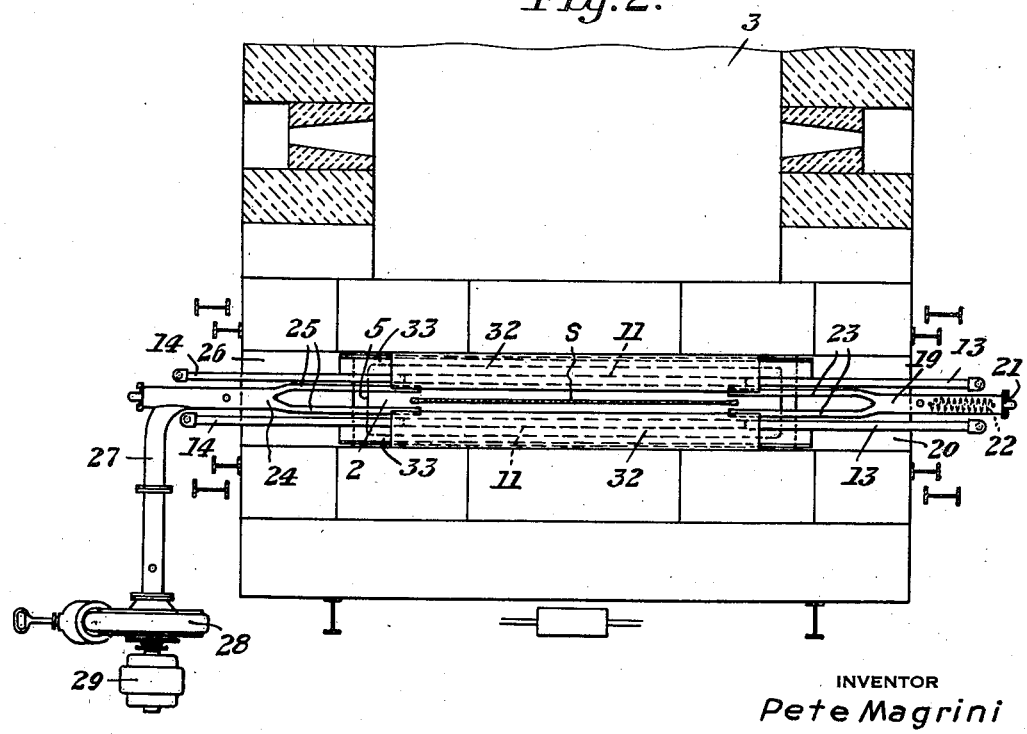
Figure 2 is a horizontal section through the drawing chamber shown in Figure 1 taken between the main and auxiliary coolers.

As shown in the drawings the molten glass in the bath B is fed to the drawing chamber 2 through a canal 3, the drawing chamber 2 being separated from the canal 3 by means of a bridge wall 4.

A floater or debiteuse 5 is positioned in the drawing chamber and is provided with a longitudinally extending slot 6 through which the glass sheet S is drawn. The floater or debiteuse 5 is held partially submerged in the glass bath by appropriate presser bars (not shown) which cooperate with the four corners thereof. The glass wells upwardly through this slot in the floater and is initially started vertically by means of a bait. The glass sheet S passes upwardly through the drawing chamber 2 between the so-called 49-blocks 7 and between the longitudinally extending angles 8 into the base of the lehr 9. The lehr is provided with a plurality of pairs of rolls 10 which carry the sheet vertically therethrough. As is well understood, the lehr 9 is a cooling lehr and is of sufficient length to permit cooling of the glass sheet to a point where it can be manually handled.

The drawing chamber is provided with a pair of main coolers 11 adjacent the meniscus 12 of the rising glass sheet, one of said coolers being provided adjacent each face of the rising glass sheet and extending longitudinally of the drawing chamber throughout the width of the glass sheet. These coolers are spaced a relatively short distance above the debiteuse and are so arranged as to be movable toward or away from the rising glass sheet in accordance with the prevailing operating conditions. Appropriate conduits 13 are provided for supplying cooling fluid to the coolers and similar conduits 14 are provided for discharging the cooling fluid from the coolers after it has been circulated therethrough. In accordance with the invention described and claimed in the Monro Patent No. 2,002,544 a pair of auxiliary coolers 15 is provided in the drawing chamber above the main coolers. These coolers are in general smaller than the main coolers but are similar thereto and are positioned on each side of the rising glass sheet and extend longitudinally of the drawing chamber throughout the width of the sheet. Conduits 16 are provided for supplying cooling fluid to these coolers and conduits 17 are provided for discharging the cooling fluid therefrom.

Preheated gas is supplied to the drawing chamber at one end thereof by means of a tunnel 19 resting on the adjacent bridge wall 20. One end of the tunnel, the inlet end, is positioned exteriorly of the drawing chamber and this end is open so as to receive either atmospheric air or any other gas which may be fed thereto. A gate 21 is provided in this end of the tunnel for regulating the flow of gas therethrough. An electric heating element 22 is provided for heating the incoming gas. This heating element is positioned in the tunnel 19 adjacent the inlet end thereof. The other end of the tunnel 19, the discharge end, is positioned within the drawing chamber. It is preferably forked so as to provide for the discharge of the preheated gas on opposite faces of the rising glass sheet and the discharge openings are positioned adjacent the meniscus so that a relatively uniform flow of gas along the meniscus and between the coolers and the rising glass sheet can be obtained. Satisfactory results can be obtained where the discharge end of the tunnel 19 is positioned above the meniscus but I have found that best results can be obtained if the air or gas passing through the tunnel 19 is discharged at or slightly above the meniscus. The forks 23 of the tunnel 19 are spaced apart a sufficient distance to permit them to project a short distance inwardly of the edge of the rising glass sheet although it is not absolutely necessary that they do so.

A similar tunnel 24 is provided at the other end of the drawing chamber. This tunnel is provided with forks 25 similar to those of the tunnel 19 and are positioned adjacent the meniscus of the rising glass sheet. These forks likewise preferably project inwardly a short distance beyond the adge of the rising glass sheet and are therefore spaced a sufficient distance to receive the edge thereof. The tunnel 24 rests upon the breast wall 26 on the discharge or exit end of the drawing chamber. The discharge end of the tunnel 24 is located outside the drawing chamber and is connected by a suitable conduit 27 to an exhaust fan 28 driven by a motor 29. The discharge outlet 30 of the exhaust fan preferably extends through the floor and is connected with the main exhaust system of the factory so as to prevent the discharge of the hot gases into the area adjacent the drawing chamber.

As stated above, I propose to protect the transverse flow of gas along the meniscus of the rising glass sheet against egress of the circulated gas from adjacent the meniscus and against ingress of stray gas currents by the use of appropriate shielding means for providing a substantially enclosed passageway for this transverse flow. In the embodiment shown in the drawings the shielding apparatus cooperates with the main coolers to protect the transversely circulated gas. In the ordinary operation of drawing apparatus such as that illustrated it is necessary to space the main coolers a short distance above the debiteuse. If they are lowered to the debiteuse they will cool it too rapidly and thus detrimentally affect the operation. Consequently, there is an area between the debiteuse and the coolers through which gas will normally circulate. I propose to shield this area so as to prevent ingress or egress of gas to or from the area immediately adjacent the meniscus. As shown in the drawings a pipe 31 is mounted on the bottom of each cooler. Each pipe 31 extends longitudinally of the drawing chamber throughout substantially the entire length of the cooler on which it is mounted. Care must be taken in securing the pipe to the cooler for if there is any irregularity in the weld between the two it will affect the gauge of the rising glass sheet. It will be understood that various other types of shields may be utilized for shielding this area. For example, small angles may be rested on the debiteuse in a position against the coolers. However, I have found that best results can be obtained by using a shield such as the open-ended pipes 31 secured to the coolers so that they can be moved with the coolers as the latter are adjusted to meet varying operating conditions.

In addition to the pipe shields 31 I propose to employ substantially horizontally extending shields 32 above the main coolers. Each of these shields extends longitudinally of the drawing chamber throughout the width of the rising glass sheet. One end of each shield 32 is supported on the upstanding leg of a heat distributing and cooling retarding angle 33 and the other end thereof is supported on the top of the adjacent cooler and extends inwardly of the cooler toward the rising glass sheet. These shields in conjunction with the coolers and the pipe shields 31 provide a passageway through which the transverse circulation of gas is effected adjacent the meniscus and effectually prevent any substantial amount of stray gas currents from striking the rising glass sheet adjacent the meniscus and effectively reduce the amount of air or gas being circulated from escaping upwardly along the rising glass sheet. It will be understood, of course, that some of the gas rises along the glass sheet in view of the fact that the inner end of the shields are spaced from the glass sheet but I have found that the quantity of gas which does rise along the glass sheet at this point does not detrimentally affect the resulting product.

The heat distributing and cooling retarding members 33 are angles which extend longitudinally throughout substantially the entire length of the drawing chamber. These angles aid in the distribution of the heat in the glass in the drawing chamber and also retard the cooling thereof and thereby increase the duration of the drawing period. As shown in the drawings the angles 33 are mounted on the breast wall a short distance above the glass bath and above the debiteuse. However, these angles may be placed in various positions in the drawing chamber. They may be placed on the glass bath or on the debiteuse or on the breast wall. Furthermore, desirable results can be obtained where these angles are not used at all or where only one is used. The horizontal leg of each of these angles preferably abuts the adjacent cooler, thereby aiding in shielding the area adjacent the meniscus.

In the structure shown in the drawings various operating conditions may be employed. I have found that highly desirable results may be obtained if the entering gas, after it has passed the heater 22, is at approximately 375° F. Where the incoming gas is at approximately this temperature the temperature of the outgoing gas at the exit end of the chamber is approximately 540° F. Careful control of the temperature of the preheated gas fed to the chamber is desirable in order to obtain best results. It is also desirable to regulate the quantity of air or gas fed to the chamber and circulated along the meniscus. I have found that desirable results can be obtained where the volume of the entering gas is approximately from 10 to 30 cubic feet per minute and where the volume of outgoing gas is approximately 275 cubic feet per minute. Of course it will be understood that the amount of gas fed to the drawing chamber and the amount exhausted therefrom will vary appreciably. However, it is desirable to circulate a substantial quantity of gas adjacent the meniscus at a relatively low velocity. If too small a volume is circulated or if the gas is circulated at too high a velocity there will be greater opportunity for stray gas currents or eddy currents to detrimentally affect the character of the product.

Where preheated gas is utilized some difficulty may be encountered in the bowing or warping of the rising glass sheet. To prevent this longitudinally extending pipes 40 are provided in the base of the lehr on opposite faces of the rising glass sheet. Each of these pipes 40 is provided with a longitudinally extending slot 41 of a length substantially equal to the width of the rising glass sheet. The pipes and the slots therein are so positioned that the slots will discharge a curtain of air against the rising glass sheet at an angle of approximately 45°. As shown in the drawings the pipes are capped at one end by caps 42 and are supported in position by brackets 43. One end of each pipe extends out of the lehr and is connected to a blower for supplying air, preferably at atmospheric temperature and under a pressure of approximately 3 inches of water, to the pipes. This blowing of a curtain of air against the rising glass sheet will prevent or correct any bowing or warping resulting from the increasing of the temperatures normally prevailing in the chamber by the circulation of preheated air therethrough.

While I have shown pipes on both sides of the rising glass sheet I have found that it is unnecessary to blow a curtain of air against both faces under some operating conditions. As a general rule it is only necessary to blow the air against the rising glass sheet on the so-called hot side, which is the side adjacent the canal.

The products obtained by the carrying out of the method and by the employment of the apparatus described above is far superior to any drawn glass manufactured heretofore. Waves and batter and similar defects are materially reduced or substantially eliminated.

As stated above, my invention is not limited to the preferred embodiment or preferred practices set forth above. The advantages of my invention may be obtained in various different ways and by various different types of apparatus; and advantageous results may be obtained where one or more of the pieces of apparatus set forth above are not used. My invention may be otherwise embodied or practiced within the scope of the appended claims.

I claim:

1. Apparatus for drawing sheet glass comprising a drawing chamber having a bath of molten glass therein, means for drawing a sheet of glass vertically from said bath, an exhauster for exhausting gases from said chamber, and means cooperating with said exhauster for circulating a gas in contact with both faces of the glass sheet from one edge thereof to the other edge thereof adjacent the meniscus.

2. Apparatus for drawing sheet glass comprising a drawing chamber having a bath of molten glass therein, means for drawing a sheet of glass vertically from said bath including a cooler adjacent each face of the rising glass sheet, means for circulating a gas in contact with at least one face of the glass sheet and transversely of the glass sheet from one edge thereof to substantially the other edge thereof adjacent the meniscus and for discharging the gas from the drawing chamber, and shielding apparatus within said chamber adjacent the meniscus cooperating with said coolers to form a passageway adjacent the meniscus of the rising glass sheet through which said gas is circulated.

3. Apparatus for drawing sheet glass comprising a drawing chamber having a bath of molten glass therein, drawing apparatus for drawing a sheet of glass vertically from said bath, means for circulating a gas in contact with both faces of the rising glass sheet in the same direction transversely of the glass sheet from one edge thereof to substantially the other edge thereof adjacent the meniscus and for discharging the circulated gas from the drawing chamber, and a longitudinally extending shielding member within said chamber adjacent the meniscus and extending between each face of the rising glass sheet and the adjacent side wall for shielding the transversely flowing gas adjacent the meniscus of the rising glass sheet.

4. Apparatus for drawing sheet glass comprising a drawing chamber having a bath of molten glass therein, means for drawing a sheet of glass vertically from said bath, means for supplying gas to one end of said chamber, means including exhausting apparatus for circulating the gas in contact with at least one face of the glass sheet and transversely of the glass sheet from one edge to the other edge thereof adjacent the meniscus and for discharging the gas from the chamber, and shielding apparatus adjacent the meniscus of the rising glass sheet extending longitudinally of the chamber between the rising glass sheet and a side wall thereof for shielding the transversely flowing gas adjacent the meniscus of the rising glass sheet.

5. Apparatus for drawing sheet glass comprising a drawing chamber having a bath of molten glass therein, means for drawing a sheet of glass vertically from the bath, a conduit extending inwardly of said chamber to a point adjacent the meniscus of the rising glass sheet, and means cooperating with said conduit for circulating a gas in contact with and transversely of both faces of the rising glass sheet and in the same direction along each face and for discharging the circulated gas from the chamber, the circulation extending substantially from one edge of the glass sheet to the other.

6. Apparatus for drawing sheet glass comprising a drawing chamber having a bath of molten glass therein, means for drawing a sheet of glass vertically from the bath, a conduit extending inwardly of said chamber to a point adjacent the meniscus of the rising glass sheet, and an exhauster communicating with said conduit for circulating a gas in contact with at least one face of the glass sheet and transversely thereof along the meniscus and for exhausting gas from said chamber.

7. Apparatus for drawing sheet glass comprising a drawing chamber having a bath of molten glass therein, means for drawing a sheet of glass vertically from the bath, a conduit extending inwardly of said chamber to a point adjacent the rising glass sheet, means cooperating with said conduit for circulating a gas in contact with at least one face of the glass sheet and transversely of the glass sheet from one edge thereof to the other edge thereof along the meniscus and for discharging gas from the chamber, and a shield adjacent the meniscus of the rising glass sheet for confining the transversely circulated gas to a space adjacent the meniscus.

8. Apparatus for drawing sheet glass comprising a drawing chamber having a bath of molten glass therein, means for drawing a sheet of glass vertically from the bath, exhausting apparatus communicating with one end of the drawing chamber, means cooperating with said exhausting apparatus for circulating a gas transversely of the rising glass sheet adjacent the meniscus from one edge of the sheet to the other edge thereof, and shielding apparatus for forming a passageway adjacent the meniscus of the rising glass sheet through which said gas is circulated in its travel adjacent the meniscus.

9. Apparatus for drawing sheet glass comprising a drawing chamber having a bath of molten glass therein, means for drawing a continuous sheet of glass vertically from the bath, a conduit having spaced forks at the discharge end thereof for introducing a gas into the chamber adjacent the meniscus of the glass sheet, said spaced forks being positioned to discharge the gas on opposite faces of the rising sheet, an exhauster, and a conduit connected to said exhauster for exhausting gas from the other end of the chamber adjacent the meniscus of the glass sheet, said exhaust conduit having spaced forks at the intake end thereof positioned on opposite faces of the glass sheet adjacent the meniscus.

10. Apparatus for drawing sheet glass comprising a drawing chamber having a bath of molten glass therein, means for drawing a continuous sheet of glass vertically from the bath, a conduit having forks at the discharge end thereof for introducing a gas into the chamber adjacent the meniscus of the glass sheet, said forks being positioned to discharge the gas on opposite faces of the rising sheet, an exhauster, a conduit connected thereto for exhausting gas from the other end of the chamber adjacent the meniscus of the glass sheet, said exhaust conduit having forks at the intake end thereof positioned on opposite faces of the glass sheet adjacent the meniscus, and a shield adjacent each face of the rising glass sheet extending throughout substantially the entire width of the sheet adapted to shield the transverse flow of gas adjacent the meniscus.

11. Apparatus for drawing sheet glass comprising a drawing chamber having a bath of molten glass therein, means for drawing a continuous sheet of glass vertically from the bath, means for introducing preheated gas into one end of the drawing chamber adjacent the meniscus of the rising glass sheet, exhausing apparatus for exhausing gas from adjacent the meniscus at the other end of the chamber, whereby a transverse flow of gas is obtained along the meniscus of the sheet, and shielding apparatus adjacent the meniscus providing a passageway for the transverse flow of gas adjacent the meniscus.

12. Apparatus for drawing sheet glass comprising a drawing chamber having a bath of molten glass therein, means for drawing a sheet of glass vertically from the bath, a cooler spaced above said bath and adjacent to and parallel with each face of the rising glass sheet, means for circulating a gas in contact with both faces of the glass sheet from one edge thereof to the other edge thereof adjacent the meniscus between each cooler and the adjacent face of the rising glass sheet and in the same direction along each face, and a shield cooperating with at least one of the coolers for preventing the flow of stray gas currents beneath the cooler.

13. Apparatus for drawing sheet glass comprising a drawing chamber having a bath of molten glass therein, means for drawing a sheet of glass vertically from the bath, a cooler spaced above said bath and adjacent each face of the rising glass sheet, means for circulating gas in contact with both faces of the glass sheet from one edge thereof to the other edge thereof adjacent the meniscus between each cooler and the adjacent face of the rising glass sheet and for discharging circulated gas from the chamber, a shield adjacent and cooperating with at least one of the coolers for preventing the flow of stray gas currents beneath the cooler, and a shield in said chamber extending over the top of at least one of said coolers and inwardly toward the rising glass sheet.

14. Apparatus for drawing sheet glass comprising a drawing chamber having a bath of molten glass therein, means for drawing a sheet of glass vertically from said bath, a cooler spaced above the bath and adjacent each face of the rising glass sheet, a gas delivery conduit extending inwardly of said chamber to a discharge point adjacent the rising glass sheet for circulating a gas in contact with each face of the rising glass sheet, and exhausting apparatus including a gas discharge conduit on the side of said chamber opposite said delivery conduit extending inwardly of the chamber to a point adjacent the rising glass sheet for exhausting the circulated gas from the chamber.

15. Apparatus for drawing sheet glass comprising a drawing chamber having a bath of molten glass therein, a slotted member in the drawing chamber at the surface of the glass, means for drawing a sheet of glass upward from said slot, a cooler spaced above said slotted member and adjacent each face of the rising glass sheet, a conduit extending inwardly of said chamber to a point adjacent the rising glass sheet, means cooperating with said conduit for circulating a gas in contact with both faces of the glass sheet in the same direction transversely of the glass sheet from one edge thereof to the other edge adjacent the meniscus and between each cooler and the adjacent face of the rising sheet and for discharging circulated gas from said chamber, and a shield cooperating with each cooler for shielding the transverse flow of gas against the effect of stray gas currents in the chamber.

16. Apparatus for drawing sheet glass comprising a drawing chamber having a bath of molten glass therein, a slotted member in the drawing chamber at the surface of the glass, means for drawing a sheet of glass upward from said slot, a cooler spaced above said slotted member and adjacent each face of the rising glass sheet, means including a discharge conduit and exhausting means connected thereto for circulating a gas in contact with both faces of the glass sheet along the meniscus thereof from one edge to the other edge thereof, and a shield cooperating with each cooler for shielding the transverse flow of gas.

17. In the method of forming a glass sheet by continuous drawing from a chamber containing a bath of molten glass, the steps comprising forming the sheet by drawing it vertically from the bath, supplying a gas to the chamber, said gas being cooler than the rising glass sheet adjacent the meniscus, and circulating said gas in contact with both faces of the glass sheet from one edge thereof to the other edge thereof through a confining passageway adjacent the meniscus, whereby the circulated gas and the rising glass sheet are shielded from stray gas currents and the circulated gas is prevented from escaping from adjacent the meniscus during its travel across the rising sheet.

18. Apparatus for drawing sheet glass comprising a drawing chamber having a bath of molten glass therein, means for drawing a continuous sheet of glass vertically from the bath, means for circulating a gas transversely of the rising glass sheet along the meniscus from one end thereof to the other end thereof including an inlet for introducing gas into the chamber and an outlet for exhausting gas from the chamber, shielding means extending transversely of the rising glass sheet adjacent the meniscus and cooperating with the circulating means for confining the flow of said gas to the area adjacent the meniscus, and at least one heat distributing and cooling retarding member extending longitudinally of the chamber on one side of the rising glass sheet adjacent the meniscus and said shielding means.

19. Apparatus for drawing sheet glass comprising a drawing chamber having a bath of molten glass therein, means for drawing a sheet of glass vertically from the bath, a cooler spaced above the bath and adjacent each face of the rising glass sheet, a gas delivery conduit for delivering gas to one end of said chamber adjacent one end of the meniscus of the rising sheet, a gas discharge conduit for discharging gas from one end of said chamber adjacent the other end of the meniscus of the rising glass sheet, and means including exhausting apparatus cooperating with said conduits for circulating a gas transversely of the rising glass sheet along the meniscus from one edge of the sheet to the other edge thereof and for exhausting the circulated gas from the chamber, at least one of said conduits extending inwardly of the drawing chamber to a point adjacent the meniscus of the glass sheet.

20. Apparatus for drawing sheet glass comprising a drawing chamber having a bath of molten glass therein, means for drawing a sheet of glass vertically from the bath, a cooler spaced above the bath and adjacent to and parallel with each face of the rising glass sheet, a gas delivery conduit for delivering gas to the chamber, a gas discharge conduit, means including an exhauster cooperating with said conduits for circulating a gas transversely of the rising glass sheet along the meniscus from one edge to the other edge thereof in contact with and in the same direction along each face and for discharging the circulated gas from the chamber, said conduits extending inwardly of the drawing chamber to a point adjacent the meniscus of the rising glass sheet, and a shield positioned adjacent and cooperating with each of said coolers for shielding the meniscus of the rising glass sheet from stray gas currents.

21. Apparatus for drawing sheet glass comprising a drawing chamber having a bath of molten glass therein, a slotted debiteuse at the surface of the glass through which the glass sheet is drawn, means for drawing a glass sheet from the bath, a cooler on each side of said slot and adjacent thereto, means including exhausting apparatus for circulating a gas transversely of the rising glass sheet from one edge thereof to the other edge thereof and in the same direction on opposite faces thereof along the meniscus and for discharging it from the chamber, a shield cooperating with each cooler for shielding the space between the cooler and the debiteuse against the passage of air therebetween, and a longitudinally extending shield extending inwardly toward the glass sheet over the top of each cooler, said shields forming a passageway on each side of the rising glass sheet through which gas may be circulated along the meniscus of the sheet.

22. In the method of forming a glass sheet by continuous drawing from a chamber containing a bath of molten glass, the steps comprising forming a sheet by drawing it vertically from the bath, introducing into said chamber gas which has been preheated to a sufficient extent to substantially preclude the formation of batter in the sheet as a result of the difference between the temperature of the gas in the chamber and that introduced therein, circulating said preheated gas in contact with both faces of the glass sheet and in the same direction transversely thereof from one edge to the other edge thereof substantially at the meniscus, and exhausting the circulated gas from the chamber at the end of its transverse travel along the meniscus.

23. In a method of forming a glass sheet by continuous drawing from a bath of molten glass in a drawing chamber, the steps comprising forming the sheet, circulating a gas in contact with both faces of the glass sheet transversely of the sheet from one edge thereof to the other edge thereof adjacent the meniscus and in the same direction along each of said faces, exhausting the circulated gas from the chamber from a point adjacent the meniscus at one edge of the glass sheet at the end of its transverse travel therealong, and shielding the circulated gas during its travel adjacent the meniscus to prevent stray gas currents from disturbing the flow of circulating gases and to prevent egress of the circulated gas from adjacent the meniscus during its transverse travel.

24. In the method of forming a glass sheet by continuous drawing from a chamber containing a bath of molten glass, the steps comprising forming the sheet by drawing it vertically from the bath, supplying a gas to the drawing chamber at one end thereof, circulating the gas in contact with both faces of the glass sheet in the same direction transversely of the sheet from one edge thereof to the other edge adjacent the meniscus, and exhausting the circulated gas from said chamber from a point adjacent the meniscus at the end thereof opposite the point where the gas is supplied to the chamber.

25. In the method of forming a glass sheet by continuous drawing from a chamber containing a bath of molten glass, the steps comprising forming the sheet by drawing it vertically from the bath, introducing preheated gas into said chamber, said gas being preheated prior to being introduced into the chamber to a temperature sufficient to preclude the formation of batter as a result of the introduction of the gas into the chamber, circulating the preheated gas in contact with both faces of the glass sheet in the same direction transversely from one edge to the other edge thereof substantially at the meniscus, exhausting the circulated gas from the chamber, and shielding the transverse current of gas and confining it to the area adjacent the meniscus during its transverse travel across the glass sheet.

PETE MAGRINI.